(12) United States Patent
Choi et al.

(10) Patent No.: US 9,128,982 B2
(45) Date of Patent: Sep. 8, 2015

(54) SEARCH SYSTEM AND SEARCH METHOD FOR RECOMMENDING REDUCED QUERY

(75) Inventors: Ji Hoon Choi, Seongnam-si (KR); Ji Seoung Kim, Seongnam-si (KR); Youn Sik Lee, Seongnam-si (KR)

(73) Assignee: NHN CORPORATION, Gyeonggi-Do (KR)

(*) Notice: Subject to any disclaimer, the term of this patent is extended or adjusted under 35 U.S.C. 154(b) by 210 days.

(21) Appl. No.: 13/333,667

(22) Filed: Dec. 21, 2011

(65) Prior Publication Data

US 2012/0166450 A1 Jun. 28, 2012

(30) Foreign Application Priority Data

Dec. 23, 2010 (KR) .................. 10-2010-0133136

(51) Int. Cl.
*G06F 17/30* (2006.01)
(52) U.S. Cl.
CPC .... *G06F 17/30439* (2013.01); *G06F 17/30448* (2013.01)
(58) Field of Classification Search
CPC ................. G06F 17/3053; G06F 17/30439
USPC ........................ 707/748, 759, 765
See application file for complete search history.

(56) References Cited

U.S. PATENT DOCUMENTS

| 6,073,130 | A  | * | 6/2000  | Jacobson et al. ............ 1/1 |
| 6,397,211 | B1 | * | 5/2002  | Cooper ................. 707/706 |
| 6,883,001 | B2 | * | 4/2005  | Abe ........................ 1/1 |
| 7,406,465 | B2 | * | 7/2008  | Jones et al. .............. 1/1 |
| 7,505,973 | B2 | * | 3/2009  | Kapadia et al. ............ 1/1 |
| 7,627,559 | B2 | * | 12/2009 | Srivastava et al. ......... 1/1 |
| 7,840,577 | B2 | * | 11/2010 | Ortega et al. ........... 707/758 |

(Continued)

FOREIGN PATENT DOCUMENTS

| JP | 09-153068   | 6/1997 |
| JP | 2005-234688 | 9/2005 |

(Continued)

OTHER PUBLICATIONS

Tatsuya Noyori, Extracting keywords of compound word by word clustering and connection relations, 69th (2007) National Conference Journal (2) Artificial Intelligence and Cognitive Science, Japanese Information Processing Society, 2007. 3. 6.

(Continued)

*Primary Examiner* — Miranda Le
(74) *Attorney, Agent, or Firm* — Harness, Dickey & Pierce, PLC

(57) ABSTRACT

A search system includes a non-transitory computer-readable storage device, and a computing device. A term extracting unit causes the computing device to extract multiple terms from an input query, a weight computing unit causes the computing device to compute a weight for each of the multiple terms, and a reduction query recommending unit causes the computing device to remove at least one term from the multiple terms, based on the weight, and to provide at least one reduced query using remaining terms. A search method that uses a computing device to provide a reduced query, the method includes extracting multiple terms from an input query; computing, by the computing device, a weight of each of the multiple terms; and removing at least one term from the multiple terms, based on the weight, and providing at least one reduced query generated using remaining terms out of the multiple terms.

17 Claims, 6 Drawing Sheets

(56) References Cited

U.S. PATENT DOCUMENTS

| | | | |
|---|---|---|---|
| 7,925,644 B2* | 4/2011 | Lin et al. | 707/713 |
| 8,001,114 B2* | 8/2011 | Chu et al. | 707/721 |
| 8,019,748 B1* | 9/2011 | Wu et al. | 707/713 |
| 8,032,527 B2* | 10/2011 | Ahn et al. | 707/732 |
| 8,046,355 B2* | 10/2011 | Alfonseca et al. | 707/721 |
| 8,051,056 B2* | 11/2011 | Suzuki et al. | 707/705 |
| 8,108,391 B1* | 1/2012 | Yang et al. | 707/736 |
| 8,280,886 B2* | 10/2012 | Labrou et al. | 707/737 |
| 8,392,440 B1* | 3/2013 | Papachristou et al. | 707/759 |
| 8,423,350 B1* | 4/2013 | Chandra et al. | 704/9 |
| 8,429,184 B2* | 4/2013 | Ismalon | 707/765 |
| 8,583,670 B2* | 11/2013 | Cameron et al. | 707/765 |
| 2004/0194141 A1* | 9/2004 | Sanders | 725/53 |
| 2004/0220907 A1* | 11/2004 | Camarillo | 707/3 |
| 2007/0010990 A1* | 1/2007 | Woo | 704/4 |
| 2008/0288243 A1* | 11/2008 | Kobayashi | 704/9 |
| 2010/0070506 A1* | 3/2010 | Whang et al. | 707/740 |
| 2010/0153366 A1* | 6/2010 | Liu | 707/722 |
| 2012/0047025 A1* | 2/2012 | Strohman | 705/14.71 |

FOREIGN PATENT DOCUMENTS

| | | |
|---|---|---|
| JP | 2006-163623 A | 6/2006 |
| JP | 2008-250893 | 10/2008 |
| KR | 10-0816912 | 3/2008 |

OTHER PUBLICATIONS

Apr. 28, 2015 Japanese Office Action issued in corresponding Japanese Application No. 2011-279933.

* cited by examiner

| TERM NO | TERM | IDF | QE | QP | QE/QP RATIO | WEIGHT |
|---|---|---|---|---|---|---|
| 0 | IMPORTED | 0.2553 | 0.6658 | 0.8358 | 0.7666 | 0.4315 |
| 1 | AZNAVOUR | 0.6985 | 0.5152 | 0.4006 | 1.0000 | 0.6671 |
| 2 | FRANCE | 0.4192 | 0.4676 | 0.5753 | 0.8128 | 0.4089 |
| 3 | ETRO | 0.4643 | 0.6758 | 0.7162 | 0.9436 | 0.5955 |
| 4 | HAIRPIN | 0.3517 | 0.7009 | 0.6555 | 1.0000 | 0.6560 |

SEARCH SYSTEM AND SEARCH METHOD FOR RECOMMENDING REDUCED QUERY

CROSS-REFERENCE TO RELATED APPLICATION

This application claims priority from and the benefit of Korean Patent Application No. 10-2010-0133136, filed on Dec. 23, 2010, and Korean Patent Application No. 10-2011-0121487, filed on Nov. 21, 2011, both of which are hereby incorporated by reference for all purposes as if fully set forth herein.

BACKGROUND OF THE INVENTION

1. Field of the Invention

Exemplary embodiments of the present invention relate to a search system and method for recommending a reduced query.

2. Discussion of the Background

In a unified search or a product search using a search method based on a conventional technology, zero or only a few search results for a query may be found in many is cases. This may happen frequently when the query is lengthy or wordy, and when an additional word unrelated to the query is included in the query. For example, in a product search, the queries "Cheongkwanjang Red Max Plus," a query "Philips steam iron 2860," or a query "Aveeno daily moisturizing body wash 354 ml+stress relief bubble bath 295 ml" may be categorized as lengthy or wordy queries. Also, the queries "Benetton hood style fox muffler," "prime cost of Absolute Kung", or "Self bangs perm" may be categorized as queries having zero or only few search results resulting from an unrelated additional word included in the queries. Further, a query reciting a category name, a brand name, and a manufacturer, for example, a query "jewelry brand-name product TAGHeuer," a query "Lacoste Gongyoo flat shoes," or a query "imported Aznavour France Etro hairpin", may lead to zero or only few search results. That is, although proper or similar products or search results for the query actually exist, products or search results that are related to each of the terms included in the query may not be found or insufficient number of search results or searched items may be provided.

Hereinafter, a system and method that may provide better search results by addressing aforementioned problems will be described.

SUMMARY OF THE INVENTION

Exemplary embodiments of the present invention provide a search system and method that may provide better and more search results in response to a lengthy query, or a query providing zero or few search results, by computing a weight of each term included in an input query and providing a reduced query by removing at least one term from the input query based on the computed weight.

Exemplary embodiments of the present invention also provide a search system and method that may compute, using a query log, mutual information between terms extracted through a morpheme analysis, and may extract a term from a query based on the computed mutual information.

Exemplary embodiments of the present invention also provide a search system and method that may select a term more appropriate for a query by computing a weight of each term based on importance of each term in a document, the number of queries exactly matching the query in a query log, the number of queries partially matching the query in the query log, a ratio of the number of queries exactly matching the query and the number of queries partially matching the query, and the like.

Exemplary embodiments of the present invention also provide a search system and method that may remove at least one term corresponding to a ranking less than or equal to a predetermined ranking based on a computed weight, and may recommend a reduced query using remaining queries.

Additional features of the invention will be set forth in the description which follows, and in part will be apparent from the description, or may be learned by practice of the invention.

An exemplary embodiment of the present invention discloses a search system, including a non-transitory computer-readable storage device including a term extracting unit, a weight computing unit, and a reduction query recommending unit stored thereon; and a computing device configured to communicate with the non-transitory computer-readable storage device. The term extracting unit causes the computing device to extract multiple terms from an input query, the weight computing unit causes the computing device to compute a weight for each of the multiple terms, and the reduction query recommending unit causes the computing device to remove at least one term from the multiple terms, based on the weight, and to provide at least one reduced query using remaining terms.

An exemplary embodiment of the present invention discloses a search method that uses a computing device to provide a reduced query, the method including extracting multiple terms from an input query; computing, by the computing device, a weight of each of the multiple terms; and removing at least one term from the multiple terms, based on the weight, and providing at least one reduced query generated using remaining terms out of the multiple terms.

An exemplary embodiment of the present invention discloses a non-transitory computer-readable medium including an executable program which, when executed by one or more processors, causes the one or more processors to perform extracting multiple terms from an input query; computing, by using the one or more processors, a weight of each of the multiple terms; and removing at least one term from the multiple terms, based on the weight, and providing at least one reduced query generated using remaining terms out of the multiple terms.

An exemplary embodiment of the present invention discloses a search method that uses a processor to provide a reduced query, the method including determining whether to generate a reduced query in response to an input query; identifying, in response to a determination to generate the reduced query, multiple terms from the input query by identifying unit terms in the input query; determining one or more reduced terms by eliminating one or more terms from the multiple terms; and providing, by using the processor, the reduced query using the one or more reduced terms.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

FIG. 3 is a table illustrating terms extracted from an input query, and weights computed for each term according to an exemplary embodiment of the present invention.

DETAILED DESCRIPTION OF THE ILLUSTRATED EMBODIMENTS

Figure 1:
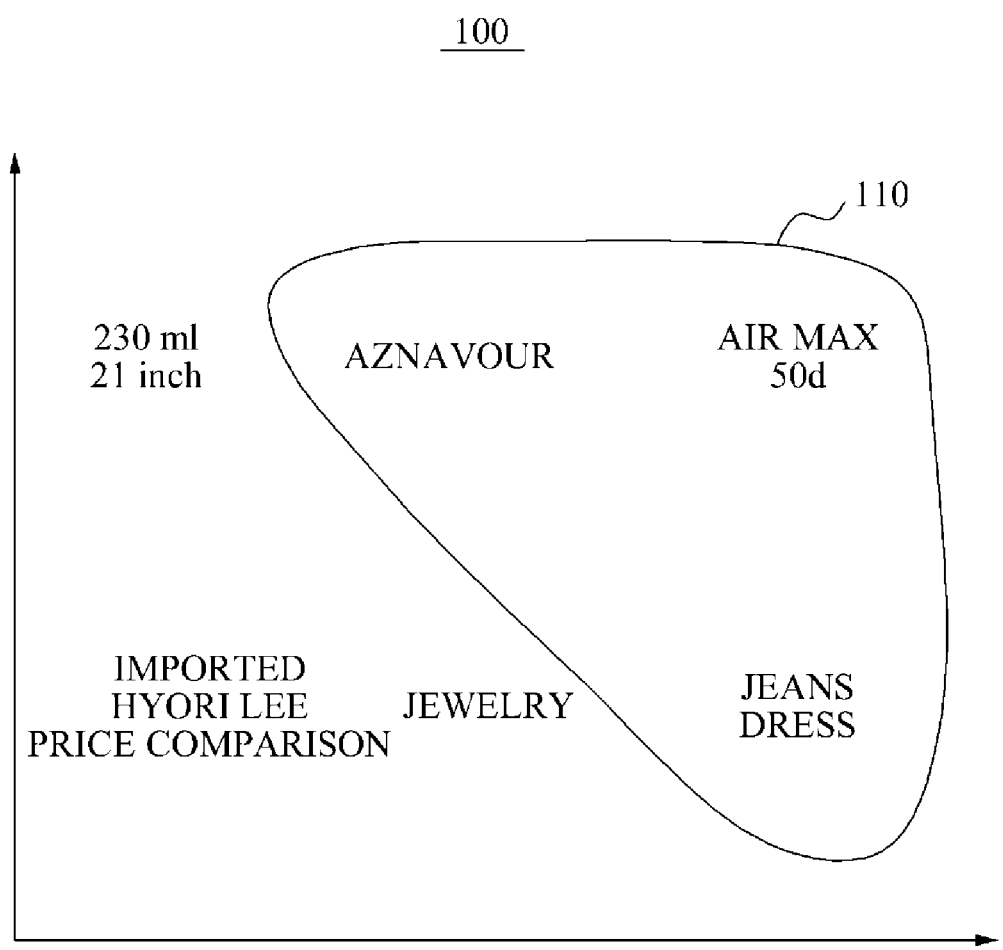
FIG. 1 is a graph illustrating categorized query terms in a product search that are classified based on user popularity and product specificity according to an exemplary embodiment of the present invention.

Exemplary embodiments now will be described more fully hereinafter with reference to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. Throughout the drawings and the detailed description, unless otherwise described, the same drawing reference numerals are understood to refer to the same elements, features, and structures. The relative size and depiction of these elements may be exaggerated for clarity, illustration, and convenience.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first", "second", and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. It will be understood that when an element is referred to as being "connected to" another element, it can be directly connected to the other element, or intervening elements may be present.

FIG. 1 is a graph 100 illustrating categorized query terms in a product search that are classified based on user popularity and product specificity according to an exemplary embodiment of the present invention. In the graph 100, the x-axis indicates a popularity value, which is a numerical value representing popularity of a term as a portion of a search query by users, and the y-axis indicates a specificity value, which is a numerical value representing specificity of a term. The specificity value may be a numerical value representing product specificity of a term included in a search query for a product search. A term may be located at a coordinate in the graph 100 based on the popularity and the specificity of the term. If the term is more frequently adopted by users as a portion of a search query, the popularity of the term may increase and the term may have higher popularity value (higher 'x' value in graph 100). If the term is more specific, the specificity of the term may have higher specificity value (higher 'y' value in graph 100). If a term is more specifically related to a certain product, product specificity may increase. For example, a term "AIR MAX" has higher specificity value than a term "shoes" because the term "AIR MAX" is more specifically related to a certain product. The graph 100 may indicate how to categorize a term according to the popularity and specificity of the term and may be used to determine whether the term is appropriate as a search query or a portion of a search query. If a search query is not appropriately selected by a user (e.g., if a search query is too lengthy, or many terms in the search query are not correlated with each other), zero or few search results may be provided by a search engine and search quality may be deteriorated. This problem may be resolved by removing one or more terms having lower popularity value or low product specificity, or one or more unrelated terms from a lengthy search query or a query including an additional word unrelated to the query with reference to the popularity value or the specificity value. The popularity value and the specificity value may be determined using a query log. For example, in the graph 100, since terms "230 ml," "21 inch," "jewelry," "imported," "Hyori Lee," "Price comparison," and the like, among terms included in a query, may have either of low user popularity or low product specificity, or both low user popularity and low product specificity in a product search, the terms may be removed from the query if the number of searched products or the number of search results is less than a threshold, for example, a predetermined value. In this instance, "230 ml" and "21 inch" may be removed since each of the terms may be rarely used by users, "imported," "Hyori Lee," and "Price comparison" may be removed since each of the terms may correspond to an additional word which may be an inappropriate term to be included in a single shopping query, and "jewelry" may be removed since the term may correspond to a term having low product specificity.

On the other hand, each term included in a region 110 of the graph 100, for example, "Aznavour," "Air Max," "50d," "jeans," or "dress," may be used as a term constituting a reduced query since the term may have either high user popularity or high product specificity, or both high user popularity and high product specificity.

According to exemplary embodiments of the present invention, in order to extract the aforementioned terms from the query input by the user, a search system may extract the terms from the query through a morpheme analysis of the query and may combine neighboring terms using mutual information between the terms. For example, if a query "import Aznavour France Etro hairpin" is analyzed into morphemes, terms may be extracted into a form of "import/Azna/vour/France/Etro/hair/pin". However, if the terms "Aznavour" and "hairpin" are respectively segmented into "Azna" and "your", and "hair" and "pin", an intention of the user who inputs the query may become more ambiguous. Accordingly, the combined terms "Aznavour" and "hairpin" may better match the intention of the user who inputs the query. Further, "body/wash" from "Aveeno/daily/moisturizing/body/wash," "steam/iron" from "Philips/steam/iron/2860," or "trench/coat" from "Burberry/trench/coat" may better match an intention of the user who inputs the corresponding query when both terms are combined than when the terms are segmented into each term. Accordingly, the search system may combine each of "body/wash," "steam/iron," and "trench/coat" into "body wash," "steam iron," and "trench coat," respectively, and may use the combined terms as a portion of a reduced query. Further, a single query may include multiple unit terms, such as terms, words, or morphemes, without having a space between neighboring unit terms. For example, if an input query "importaznavourfranceetrohairpin" is input by a user without having a space between neighboring terms, multiple terms may be identified by the morpheme analysis. The unit terms, such as morphemes, may be identified with reference to web documents database, dictionaries, previous query log, and the like. A single query having no space between terms may be analyzed and terms may be extracted into a form of "import/azna/vour/france/etro/hair/pin". If mutual information between neighboring terms is obtained, 'import', 'aznavour', 'france', 'etro', and 'hairpin' may be identified as multiple terms. The neighboring terms 'azna' and 'your' and the neighboring terms 'hair' and 'pin' may be identified as single terms based on the mutual information.

In order to achieve the foregoing, the search system may compute mutual information of neighboring terms, among the terms extracted through the morpheme analysis. For example, the mutual information may be computed as expressed by Equation 1.

$$MI(x, y) = \log \frac{p(x, y)}{p(x)p(y)} = \log \frac{\frac{n(x, y)}{T}}{\frac{n(x)}{T}\frac{n(y)}{T}}, \quad [\text{Equation 1}]$$

where 'MI' denotes mutual information, and 'x' and 'y' denote neighboring terms respectively. 'n(x, y)' denotes the number of queries including both 'x' and 'y' in a query log, and 'n(x)' denotes the number of queries including 'x' in the query log, and 'n(y)' denotes the number of queries including 'y' in the query log. 'T' denotes the total number of cases in which a term is included in the query in the query log, or 'T' may be the total number of queries in the query log.

If the mutual information between the neighboring terms is computed, the search system may determine a weak concept using a threshold value for the mutual information. The weak concept may correspond to neighboring terms having mutual information higher than the threshold value. That is, the neighboring terms may have a weak concept if the neighboring terms are used separately. If the mutual information is higher than the threshold value, the two neighboring terms may be determined as a 'weak concept', thus the two neighboring terms may be combined with each other to convey the intention of the user who inputs the query during a search process. In this instance, the threshold value used to determine the weak concept may be defined as expressed by Equation 2.

$$\text{If } \frac{p(weakconcept = 1 \mid x, y)}{p(weakconcept = 0 \mid x, y)} > 1.0 \quad [\text{Equation 2}]$$

then $(x, y) \in$ weak concept;, where 'p(weakconcept=1|x,y)' denotes a probability of the term 'x' and the term 'y' corresponding to a weak concept, and 'p(weakconcept=0|x,y)' denotes a probability of the term 'x' and the term 'y' failing to correspond to the weak concept.

Figure 2:
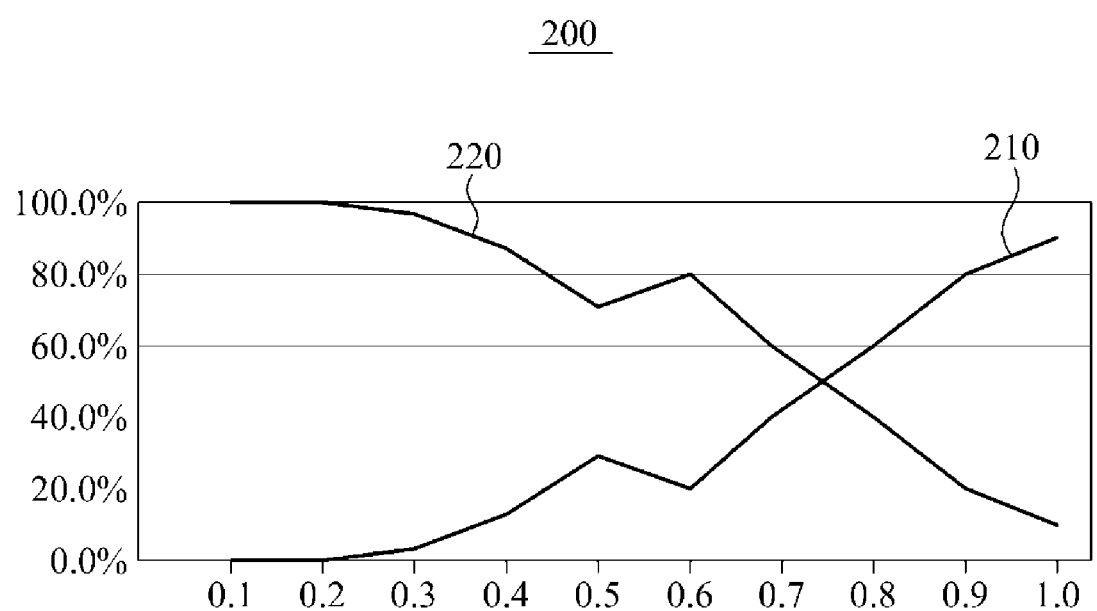
FIG. 2 is a graph illustrating a threshold value of mutual information for weak concept extraction according to an exemplary embodiment of the present invention.

FIG. 2 is a graph 200 illustrating a threshold value of mutual information for determining weak concept according to an exemplary embodiment of the present invention. In the graph 200, an x-axis shows a value of mutual information, and a y-axis shows a rate. Specifically, when a value of mutual information of a term 'x' and a term 'y' is indicated for each section, using histograms, frequencies of 'p(weakconcept=1|x,y)' and 'p(weakconcept=0|x,y)' of Equation 2 may be verified, and the frequencies may be expressed as a rate (or probability). A first broken line 210 indicates 'p(weakconcept=1|x,y),' and a second broken line 220 indicates 'p(weakconcept=0|x,y).' The graph 200 indicates that, if the value of the mutual information is close to 1.0, the probability of the term 'x' and the term 'y' corresponding to the weak concept may increase. For example, the probability of the term 'x' and the term 'y' failing to correspond to the weak concept ('p(weakconcept=0|x,y)') is 80.0% when the mutual information value is 0.6. However, the probability of the term 'x' and the term 'y' failing to correspond to the weak concept ('p(weakconcept=0|x,y)') is 60.0% when the mutual information value is 0.7.

Referring to Equation 2, a case in which a value of 'p(weakconcept=1|x,y)/p(weakconcept=1|x,y)' is equal to 1.0 corresponds to a point where the first broken line 210 and the second broken line 220 intersects. A mutual information value at this point may be defined as a threshold value, and the term 'x' and the term 'y' having mutual information greater than the defined threshold value may be determined as a weak concept. In this instance, a determination frequency of the weak concept may decrease when the threshold is high, and an accuracy of extraction of the weak concept may decrease when the threshold is small.

FIG. 3 is a table illustrating terms extracted from an input query, and weights computed for each term according to an exemplary embodiment of the present invention. The table 300 shows a weight of each term computed after terms "imported," "Aznavour," "France," "Etro," and "hairpin" are extracted from a query "imported Aznavour France Etro hairpin" using the method described with respect to FIG. 1 and/or the method using the morpheme analysis. Herein, a weight may be used as a criterion for selecting a term to be removed to generate a reduced query, and the weight may be indicated by numerically expressing importance of each term in a search. Further, all of a first weight, a second weight, a third weight and a fourth weight, that will be described later, may be used, or at least one among, the first weight, the second weight, the third weight and the fourth weight may be used. Also, a weight numerically expressing importance of each term that is different from the first weight, the second weight, the third weight, and the fourth weight may be used.

In the table 300, a 'TERM NO' denotes a term identifier. The term identifier may be randomly assigned to each term to identify the term by the term identifier, and a 'TERM' denotes each of the extracted terms.

An 'IDF', which stands for an Inverted Document Frequency, may correspond to a first weight that may be computed based on a display frequency of a term in documents. The 'IDF' may be computed as expressed by Equation 3.

$$IDF_t = \frac{\log\left(\frac{N - df_t + 0.5}{df_t + 0.5}\right)}{\log\left(\frac{N - 1 + 0.5}{1 + 0.5}\right)}, \quad [\text{Equation 3}]$$

where 't' denotes a corresponding term, and 'N' denotes the number of all corresponding documents. Also, '$df_t$' denotes the number of documents including the term 't,' that is, a frequency of the documents including 't'.

A 'QE', which stands for a Query Exactly Match, may correspond to a second weight that may be computed based on the number of cases in which a query included in a query log matches the corresponding term exactly. The 'QE' may be computed as expressed by Equation 4.

$$QE_t = \log\left(\frac{eqf_t}{T}\right),\qquad\text{[Equation 4]}$$

where '$QE_t$' denotes a 'QE' of a term 't,' '$eqf_t$' denotes the number of cases in which a query included in the query log is matched with the corresponding term exactly, and 'T' denotes the number of all queries included in the query log. In this instance, "exactly match" may indicate a case in which the corresponding term is input as a query. That is, the corresponding term is equal to the query.

A 'QP', which stands for a Query Partially Match, may correspond to a third weight that may be computed based on a number of cases in which a query included in the query log is partially matched with the corresponding term. The 'QP' may be computed as expressed by Equation 5.

$$QP_t = \log\left(\frac{pqf_t}{T}\right),\qquad\text{[Equation 5]}$$

where '$QP_t$' denotes a 'QP' of the term 't,' '$pqf_t$' denotes the number of cases in which a query included in the query log is partially match the corresponding term, and 'T' denotes to number of all queries included in the query log. In this instance, "partially match" may indicate a case in which the corresponding term is included in a query.

A 'QE/QP ratio' may correspond to a fourth weight that may be computed using a ratio of a 'QE' and a 'QP.' The 'QE/QP ratio' may be computed as expressed by Equation 6.

$$QEQP_t = \frac{QE_t}{QP_t},\qquad\text{[Equation 6]}$$

where '$QEQP_t$' denotes a 'QE/QP ratio' of the term 't.'

Further, according to another exemplary embodiment of the present invention, the 'IDF' may be computed as expressed by Equation 7.

$$\text{if } r1 > (n \times r2), \text{ then } IDF_t = \log\left(\frac{r1}{r2}\right),\qquad\text{[Equation 7]}$$

$$\text{else, } IDF_t = \log(n), \text{ where } n \geq 1$$

$$r1 = \log\left(\frac{N - df_t + 0.5}{df_t + 0.5}\right), r2 = \log\left(\frac{N - 1 + 0.5}{1 + 0.5}\right),$$

where 't' denotes a corresponding term, and 'N' denotes the number of all corresponding documents. Also, '$df_t$' denotes the number of documents including the term 't,' that is, a frequency of the documents including 't'. 'n' may be a constant larger than or equal to 1. For example, the 'n' may be a number in a range of about 1 to about 10.

Further, the 'QE' may be computed as expressed by Equation 8.

$$QE_t = \frac{\log(eqf_t + 1)}{\log(T + 1)},\qquad\text{[Equation 8]}$$

where '$QE_t$' denotes a 'QE' of a term 't,' '$eqf_t$' denotes the number of cases in which a query included in the query log is matched with the corresponding term exactly, and 'T' denotes the number of all queries included in the query log. In this instance, "exactly match" may indicate a case in which the corresponding term is input as a query. That is, the corresponding term is equal to the query.

Further, the 'QP' may be computed as expressed by Equation 9.

$$QP_t = \frac{\log(pqf_t + 1)}{\log(T + 1)},\qquad\text{[Equation 9]}$$

where '$QP_t$' denotes a 'QP' of the term 't,' '$pqf_t$' denotes the number of cases in which a query included in the query log may partially match the corresponding term, and 'T' denotes the number of all queries included in the query log. In this instance, "partially match" may indicate a case in which the corresponding term is included in a query.

A 'weight' may correspond to an aggregated weight applied to a term, and may be computed based on at least one of the first weight, the second weight, the third weight, and the fourth weight. According to an example of FIG. 3, the aggregated weight may be computed as expressed by Equation 10.

$$\text{weight}_t = a \times IDF_t + b \times QE_t + c \times QP_t + d \times QEQP_t,\qquad\text{[Equation 10]}$$

where 'weight$_t$' denotes the aggregated weight of the term 't.' Coefficient values 'a,' 'b,' 'c,' and 'd' denote coefficient weights for the first weight, the second weight, the third weight and the fourth weight, respectively. That is, the aggregated weight 'weight$_t$' may correspond to a weighted-sum computed based on the first weight, the second weight, the third weight, and the fourth weight and their coefficient weights.

Figure 4:
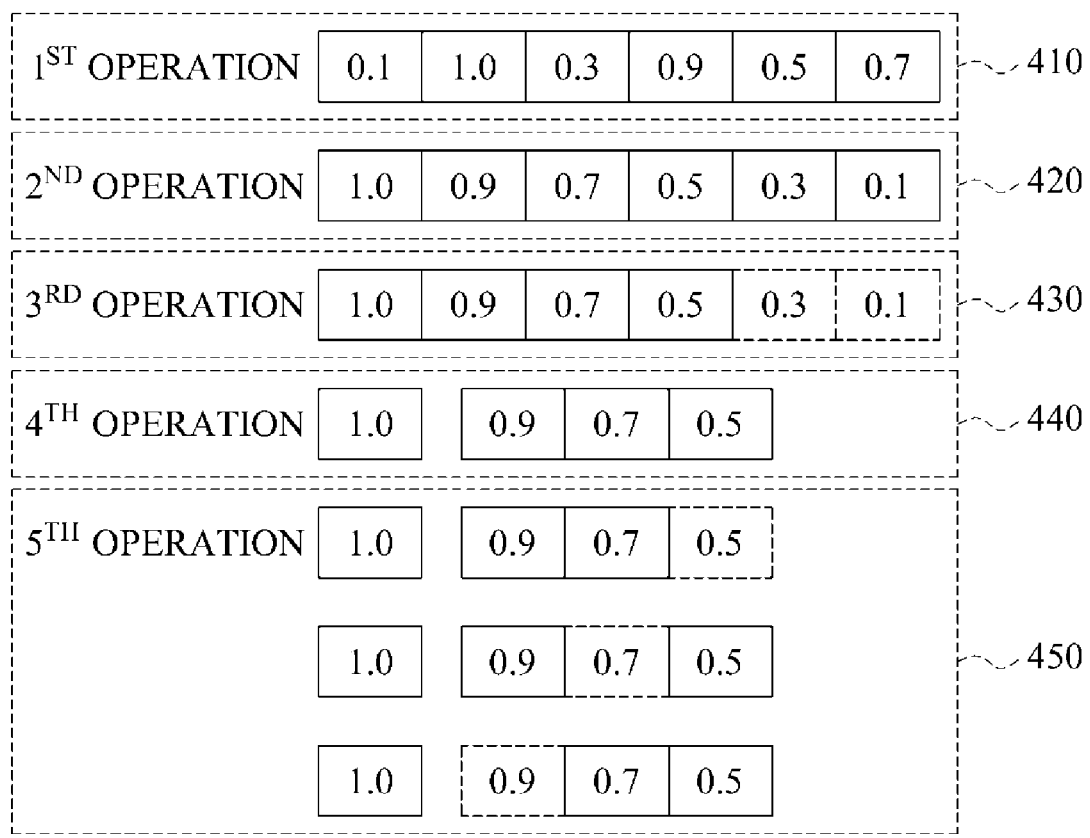
FIG. 4 is a diagram illustrating a method for generating a reduced query according to an exemplary embodiment of the present invention.

If a weight of each term is computed, a search system may remove at least one term from the extracted terms based on the computed weight and may provide at least one reduced query using remaining terms, as illustrated in FIG. 4.

FIG. 4 is a diagram illustrating a method for generating a reduced query according to an exemplary embodiment of the present invention. In FIG. 4, each cell including a number may correspond to a single term extracted from a query and the number in each cell may indicate a weight of the corresponding term.

In the first operation, an operation of computing weights of terms may be performed. A first dotted box 410 illustrates six terms extracted from a query and computed weights of the extracted terms.

In the second operation, an operation of arranging the extracted terms based on the computed weights may be performed. A second dotted box 420 illustrates the six terms that are arranged based on the weights.

In the third operation, an operation of removing at least one term corresponding to a ranking less than or equal to a determined ranking value. In an example of FIG. 4, the determined ranking value may correspond to the fifth ranking. A third dotted box 430 illustrates two terms to be removed. The two terms to be removed have the fifth ranking and the sixth ranking respectively. In FIG. 4, a cell corresponding to a term to be removed is indicated using a dotted line.

In the fourth operation, an operation of selecting a term having the highest weight as a key term may be performed. A fourth dotted box 440 illustrates that the term having a weight of '1.0' may be selected as the key term.

In the fifth operation, an operation of recommending at least one reduced query using the key term and the other three candidate terms may be performed. A fifth dotted box 450 illustrates that a term having a weight of '0.5,' a term having a weight of '0.7,' and a term having a weight of '0.9' may be sequentially removed, and a reduced query may be generated by combining remaining terms.

For example, for a query "imported Aznavour France Etro hairpin", a reduced query "Aznavour Etro hairpin" generated by removing terms "imported" and "France" from the query "imported Aznavour France Etro hairpin", and another reduced query "imported Aznavour hairpin" generated by removing terms "France" and "Etro" from the query "imported Aznavour France Etro hairpin" may be recommended. An effect of term reduction in a product search, a unified search, and the like may result in an increase in the number of products or search results to provide.

Figure 5:
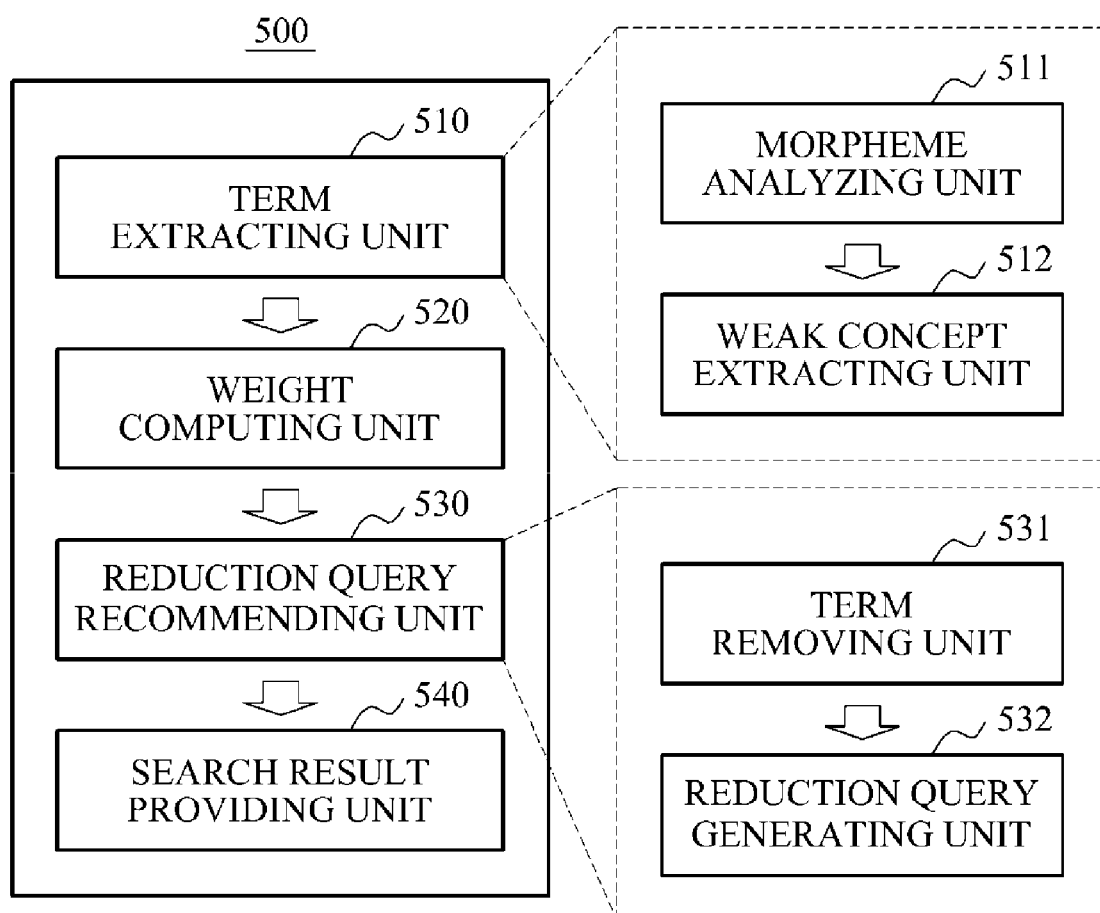
FIG. 5 is a block diagram illustrating a configuration of a search system to generate a reduced query according to an exemplary embodiment of the present invention.

FIG. 5 is a block diagram illustrating a configuration of a search system to generate a reduced query according to an exemplary embodiment of the present invention. As shown in FIG. 5, the search system 500 may include a term extracting unit 510; a weight computing unit 520, a reduction query recommending unit 530, and a search result providing unit 540. Here, the search result providing unit 540 may be implemented in a separate system from the search system 500. For example, the search system 500 may transmit a reduced query to the separate system, and the separate system may provide the received reduced query to a user, or may provide the user with search results generated in response to the received reduced query.

The term extracting unit 510 may extract multiple terms from an input query. In an example, the input query may be a query providing search results less than a determined number of search results if a search is performed using the input query. In another example, the input query may be a query input by a user for a product search. The query may provide searched products less than a determined number of products information if a search is performed using the input query. If the input query is determined to be a query providing less number of search results or products information than a threshold value, the determined number of search results or the determined number of product search, the term extracting unit 510 may determine to eliminate one or more term from the input query to generate a reduced query. The term extracting unit 510 may extract neighboring terms as a single term by combining neighboring terms having mutual information greater than a threshold value through weak concept determination rather than extracting each of the terms individually through a morpheme analysis. The term extracting unit 510 may include a morpheme analyzing unit 511 and a weak concept extracting unit 512. The morpheme analyzing unit 511 may extract a plurality of terms by analyzing morphemes of the input query. The weak concept extracting unit 512 may compute, using a query log, mutual information between neighboring terms in the input query, among the plurality of terms. The weak concept unit 512 may combine, into a single term, the neighboring terms having mutual information greater than a threshold value.

The weight computing unit 520 may compute a weight of each of the multiple terms extracted. The weight computing unit 520 may compute the weight of each of the multiple terms, based on at least one of a first weight, a second weight, a third weight and a fourth weight. The first weight of a term may be computed based on the number of all documents and the number of documents including the term. The second weight may be computed based on the number of queries included in a query log and the number of cases in which a query included in the query log matches the corresponding query exactly. The third weight may be computed based on the number of queries included in the query log and the number of cases in which a query included in the query log partially matches the corresponding query. The fourth weight may be computed based on a ratio of the second weight to the third weight.

The reduction query recommending unit 530 may remove at least one term from the multiple terms extracted, based on the computed weight, and may provide at least one reduced query using remaining terms. The reduction query recommending unit 530 may eliminate a certain number of terms having lower weights and may provide at least one reduced query by recombining the remaining terms.

The reduction query recommending unit 530 may include a term removing unit 531 and a reduction query generating unit 532. The term removing unit 531 may remove, from the multiple terms, at least one term corresponding to a ranking less than or equal to a determined ranking based on the weight of the term. The reduction query generating unit 532 may generate at least one reduced query using the remaining terms by excluding at least one term. Further, the reduction query generating unit 532 may select, from the remaining terms, a term having the highest weight as a key term and may generate the at least one reduced query based on a combination of the key term and the other remaining terms. The key term may not be eliminated; however, at least one term may further be eliminated among the other remaining terms as shown in FIG. 4.

The search result providing unit 540 may provide search results to the user who inputs the query, using at least one reduced query. The search results obtained in response to the reduced query may be displayed in a separate area of a webpage along with the search results obtained in response to the original query. That is, the search results obtained in response to the original query may be displayed in a first area of a webpage, and the search results obtained in response to the reduced query may be displayed in a second area of the webpage. Further, the search result providing unit 540 may provide, to the user, at least one reduced query and the number of search results for each of the at least one reduced query, and the search result providing unit 540 may provide, to the user, search results for a reduced query selected by the user. For example, if the number of search results for a first reduced query is 5, the number of search results for a second reduced query is 40, and the number of search results for a third reduced query is 50, the search results providing unit 540 may provide, to the user, the three reduced queries, and the number of search results for each of the three reduced queries (e.g., "first reduction query: 5 search results, second reduction query: 40 search results, third reduction query: 50 search results"). Further, the search results providing unit 540 may provide, to the user, search results for a reduced query selected by the user.

Further, the search result providing unit 540 may provide, to the user, search results obtained based on a reduced query providing the highest number of search results along with the reduced query, or may provide, to the user, all search results obtained based on multiple reduced queries. For example, the search result providing unit 540 may provide, to the user, the 50 search results obtained based on the third reduced query, which is the reduced query providing the highest number of search results, or may provide all 95 search results obtained based on the three reduced queries to the user. The search results may be provided by eliminating duplicated search results. Thus, the number of provided search results may be less than 95.

Figure 6:
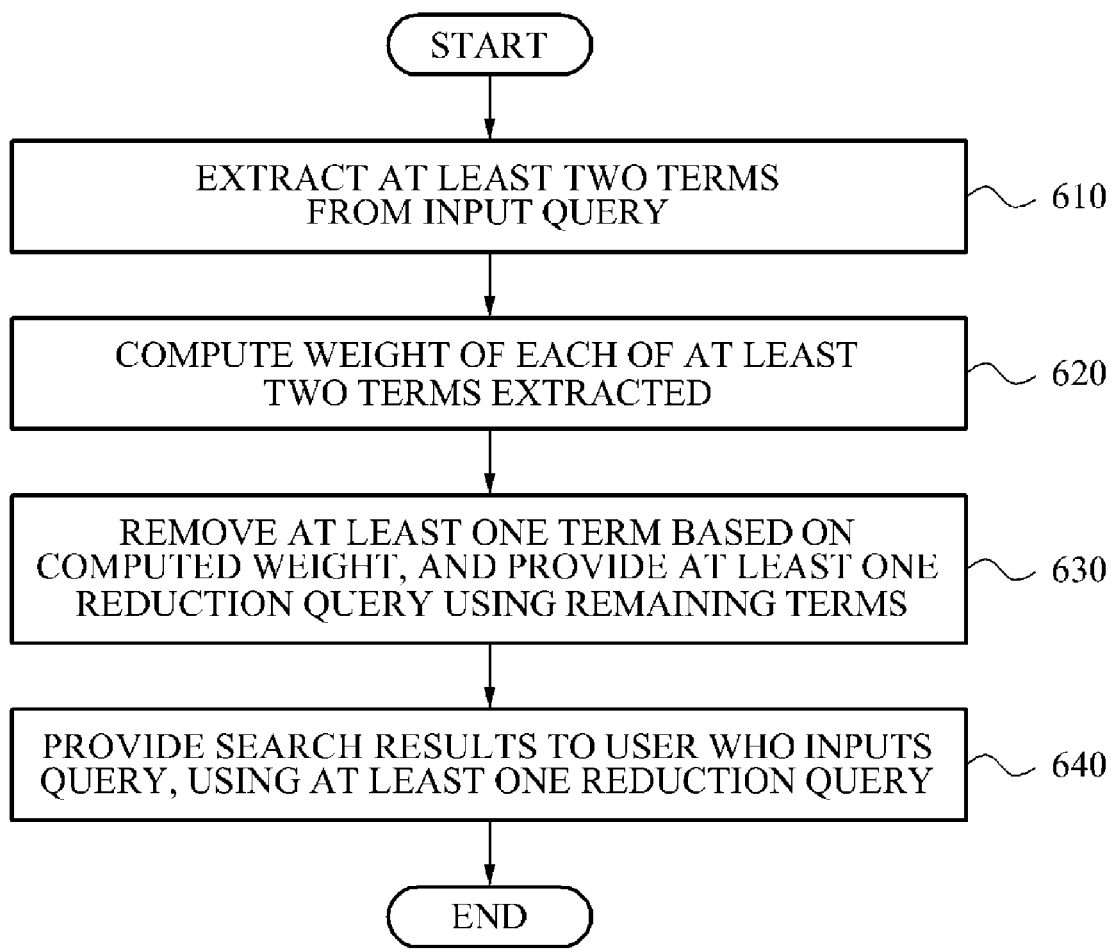
FIG. 6 is a flowchart illustrating a search method using a reduced query according to an exemplary embodiment of the present invention.

FIG. 6 is a flowchart illustrating a search method using a reduced query according to an exemplary embodiment of the present invention. The search method may be performed by the search system 500 described with reference to FIG. 5, however, it is not limited as such. In FIG. 6, the search method will be described as if it is performed by the search system 500. Operation 640 may be excluded from the search method. Further, operation 640 may be performed by another system in association with the search system 500.

In operation 610, the search system 500 may extract multiple terms from an input query. The input query may be a query providing search results less than a certain number of search results when a search is performed using the input query. Further, the query may be a query input by a user for a product search and the query may be a query providing products information less than a certain number of pieces of products information. The search system 500 may extract terms as a single term by combining neighboring terms having mutual information greater than a threshold value using weak concept determination, rather than extracting terms just using a morpheme analysis. The search system 500 may perform an operation (not shown) of extracting a plurality of terms by analyzing morphemes of the input query and an operation (not shown) of computing, using a query log, mutual information between neighboring terms in the input query, among the multiple terms and combining the neighboring terms having mutual information greater than a threshold value into a single term.

In operation 620, the search system 500 may compute a weight of each of the multiple terms. The search system 500 may compute the weight of each of the multiple terms, based on at least one of a first weight, a second weight, a third weight and a fourth weight. The first weight of a term may be computed based on the number of all documents and the number of documents including the term. The second weight may be computed based on the number of queries included in a query log and the number of cases in which a query included in the query log matches the corresponding query exactly. The third weight may be computed based on the number of queries included in the query log and the number of cases in which a query included in the query log partially matches the corresponding query. The fourth weight may be computed based on a ratio of the second weight to the third weight.

In operation 630, the search system 500 may remove at least one term from the extracted multiple terms, based on the computed weight and may provide at least one reduced query using remaining terms. That is, the search system 500 may remove a certain number of terms having lower weights and may provide a reduced query by combining the remaining terms.

Further, the search system 500 may perform an operation (not shown) of removing, from the multiple terms, at least one term corresponding to a ranking less than or equal to a determined ranking based on the weight. Further, the search system 500 may perform an operation (not shown) of generating at least one reduced query using the remaining terms, excluding the at least one removed term. Further, the search system 500 may select, from the remaining terms, a term having the highest weight as a key term and may generate at least one reduced query based on a combination of the key term and the other terms. One or more terms may further be removed from the remaining terms except the key term.

In operation 640, the search system 500 may provide search results to the user who inputs the query, using a reduced query. For example, the search system 500 may provide, to the user, one or more reduced queries and the number of search results for each of the reduced queries. The search system 500 may provide, to the user, search results for a reduced query selected by the user. For example, if the number of search results for a first reduction query is 5, the number of search results for a second reduced query is 40, and the number of search results for a third reduced query is 50, the search system 500 may provide, to the user, the three reduced queries and the number of search results for each of the three reduced queries. For example, "first reduction query: 5 search results, second reduction query: 40 search results, third reduction query: 50 search results" may be displayed in a webpage. The search system 500 may provide, to the user, search results for a reduced query selected by the user.

Further, the search system 500 may provide, to the user, search results for a reduced query providing the highest number of search results, or may provide, to the user, all search results obtained based on multiple reduced queries. For example, the search system 500 may provide, to the user, the 50 search results obtained based on the third reduced query, which is the reduced query providing the highest number of search results, or may provide all 95 search results to the user. The search results may be provided by eliminating duplicated search results.

Exemplary embodiments of the present invention may provide a system and method for effectively providing search results in response to a lengthy query, or a query providing zero or few search results, by computing a weight of each term included in an input query and providing a reduced query by removing at least one term from the input query based on the computed weight. Further, mutual information between terms extracted by a morpheme analysis may be computed using a query log, and a term may be more effectively extracted from a query based on the computed mutual information. Also, a term that is more appropriate for a query may be selected by computing a weight of each term based on importance of each term in a document, a number of queries exactly matching the query in a query log, a number of queries partially matching the query in the query log, a ratio of the number of queries exactly matching the query and the number of queries partially matching the query, and the like. In addition, a reduced query may be recommended using remaining terms by removing at least one term corresponding to a ranking less than or equal to a determined ranking based on the computed weight.

The method according to exemplary embodiments of the present invention may be recorded in non-transitory computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD-ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A search system, comprising:
a non-transitory computer-readable storage device comprising modules stored thereon, the modules being executable by a computing device; and
the computing device configured to communicate with the non-transitory computer-readable storage device, wherein the modules comprise,
a term extracting unit configured to extract a plurality of terms from an input query,
the term extracting unit including a morpheme analyzing unit configured to extract the plurality of terms by analyzing morphemes of the input query, and
the term extracting unit including a weak concept extracting unit configured to,
compute mutual information between neighboring terms using a query log from among the plurality of terms,
the mutual information is computed based on a number of times that each of the neighboring terms is used in the query log and a number of times that the neighboring terms are used together in the query log, and
the mutual information being computed based on a ratio of a first number to a second number, the first number being a number of queries including both a first term and a second term, the second number being a product of a number of queries including the first term multiplied by a number of queries including the second term, and
combine the neighboring terms into a single term if the computed mutual information of the neighboring terms is greater than a threshold value, the threshold value being based on a probability that the neighboring terms correspond to a weak concept, the weak concept indicating a lack of relatedness between at least two of the plurality of terms,
a weight computing unit configured to compute a weight for each of the extracted terms,
a reduction query recommending unit configured to,
remove at least one of the extracted terms, based on the weight,
designate another one of the extracted terms as a key term, and
provide reduced queries using the key term and different combinations of the remaining terms.

2. The search system of claim 1, wherein the reduced queries comprise a first reduced query and a second reduced query, and the input query provides fewer search results than the first reduced query or the second reduced query.

3. The search system of claim 1, wherein the weight computing unit is configured to compute the weight of each of the extracted terms, based on at least one of, a first weight computed based on a number of all documents and a number of documents including a corresponding term,
a second weight computed based on a number of queries included in a query log and a number of times that a query included in the query log matches the corresponding query exactly,
a third weight computed based on the number of queries included in the query log and a number of times that a query included in the query log partially matches the corresponding query, and
a fourth weight computed based on a ratio of the second weight to the third weight.

4. The search system of claim 1, wherein the reduction query recommending unit comprises:
a term removing unit configured to remove the at least one of the extracted terms, based on the weight, if the at least one removed term has lower weight than the remaining terms; and
a reduction query generating unit configured to generate a reduced query using the key term and the remaining terms.

5. The search system of claim 1, further comprising:
a search result providing unit configured to provide search results in response to the input query, using the at least one reduced queries.

6. The search system of claim 5, wherein the search result providing unit provides search results for the reduced queries.

7. The search system of claim 1, wherein the input query is a query input by a user for a product search, and a number of product search results that the input query provides is less than a determined number of product search results.

8. The search system of claim 1, wherein the key term has a higher weight than the remaining terms.

9. The search system of claim 1, wherein the reduced queries comprise a first reduced query and a second reduced query, and
the first reduced query is generated by removing a first non-key term from the remaining terms, and the second reduced query is generated by removing a second non-key term from the remaining terms.

10. A search method that uses a computing device to provide a reduced query, the method comprising:
extracting a plurality of terms from an input query, the extracting the plurality of terms includes,
extracting the plurality of terms by analyzing morphemes of the input query,
computing mutual information between neighboring terms in the input query, among the plurality of terms, using a query log,
the mutual information being computed based on a number of times that each of the neighboring terms is used in the query log and a number of times that the neighboring terms are used together in the query loci,
the mutual information being computed based on a ratio of a first number to a second number, the first number being a number of queries including both a first term and a second term, the second number being a product of a number of queries including the first term multiplied by a number of queries including the second term, and
combining the neighboring terms into a single term if the computed mutual information of the neighboring terms is greater than a threshold value, the threshold value being based on a probability that the neighboring terms correspond to a weak concept, the weak concept indicating a lack of relatedness between at least two of the plurality of terms;

computing, by the computing device, a weight of each of the extracted terms;

removing at least one of the extracted terms, based on the weight, designating another one of the extracted terms as a key term, and providing reduced queries using the key term and different combinations of the remaining terms.

11. The search method of claim 10, wherein the reduced queries comprise a first reduced query and a second reduced query, and the input query provides fewer search results than the first reduced query or the second reduced query.

12. The search method of claim 10, wherein the extracting of the terms comprises:

computing mutual information between neighboring terms in the input query, among the plurality of terms, using a query log, and combining the neighboring terms into a single term if the mutual information of the neighboring terms is greater than a threshold value.

13. The search method of claim 10, wherein the computing of the weight comprises:

computing the weight of each of the extracted terms, based on at least one of,
- a first weight computed based on a number of all documents and a number of documents including a corresponding term,
- a second weight computed based on a number of queries included in a query log and a number of queries included in the query log that match the corresponding query exactly,
- a third weight computed based on the number of queries included in the query log and a number of queries included in the query log that partially match the corresponding query, and
- a fourth weight computed based on a ratio of the second weight to the third weight.

14. The search method of claim 10, further comprising:

removing the at least one term from the extracted terms based on the weight if the at least one term has lower ranking than the remaining terms; and generating the reduced queries using the key term and the remaining terms.

15. The search method of claim 10, further comprising:

providing search results in response to the input query, using the reduced queries.

16. The search method of claim 10, wherein the reduced queries are generated if a search using the input query provides fewer than a predetermined number of search results.

17. A non-transitory computer-readable medium comprising an executable program which, when executed by one or more processors, configures the one or more processors to:

extract terms from an input query, in the extracting the terms, the executable program configures the processor to, extract the plurality of terms by analyzing morphemes of the input query, compute mutual information between neighboring terms in the input query, among the plurality of terms, using a query log, the mutual information being computed based on a number of times that each of the neighboring terms is used in the query log and a number of times that the neighboring terms are used together in the query log, the mutual information being computed based on a ratio of a first number to a second number, the first number being a number of queries including both a first term and a second term, the second number being a product of a number of queries including the first term multiplied by a number of queries including the second term, and combine the neighboring terms into a single term if the computed mutual information of the neighboring terms is greater than a threshold value, the threshold value being based on a probability that the neighboring terms correspond to a weak concept, the weak concept indicating a lack of relatedness between at least two of the plurality of terms;

compute, by the computing device, a weight of each of the extracted terms;

remove at least one of the extracted terms, based on the weight, designating another one of the extracted terms as a key term, and providing reduced queries using the key term and different combinations of the remaining terms.

* * * * *